(12) United States Patent
Miyata

(10) Patent No.: US 11,941,306 B2
(45) Date of Patent: Mar. 26, 2024

(54) INFORMATION PROCESSING SYSTEM

(71) Applicant: CANON KABUSHIKI KAISHA, Tokyo (JP)

(72) Inventor: Takaaki Miyata, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/978,398

(22) Filed: Nov. 1, 2022

(65) Prior Publication Data

US 2023/0142554 A1 May 11, 2023

(30) Foreign Application Priority Data

Nov. 9, 2021 (JP) ................ 2021-182650

(51) Int. Cl.
*G06K 15/00* (2006.01)
*G06F 3/12* (2006.01)
*G06T 7/00* (2017.01)
*G06V 10/762* (2022.01)
*H04N 1/00* (2006.01)

(52) U.S. Cl.
CPC ............ *G06F 3/1208* (2013.01); *G06F 3/121* (2013.01); *G06F 3/1234* (2013.01); *G06T 7/0004* (2013.01); *G06V 10/762* (2022.01); *H04N 1/00005* (2013.01); *H04N 1/00015* (2013.01); *H04N 1/00074* (2013.01); *H04N 1/00408* (2013.01); *H04N 1/00488* (2013.01); *H04N 1/0049* (2013.01); *G06T 2207/20081* (2013.01); *G06T 2207/30144* (2013.01)

(58) Field of Classification Search
CPC ...... G06F 3/1208; G06F 3/121; G06F 3/1234; H04N 1/00005; H04N 1/00015; H04N 1/00074; H04N 1/00408; H04N 1/00488; H04N 1/0049
See application file for complete search history.

(56) References Cited

U.S. PATENT DOCUMENTS

| | | | |
|---|---|---|---|
| 2011/0299099 A1* | 12/2011 | Xu ................. | H04N 1/6047 358/1.9 |
| 2011/0299109 A1* | 12/2011 | Kamisuwa ......... | G03G 15/5079 358/1.14 |
| 2017/0295293 A1* | 10/2017 | Oki .................. | H04N 1/00005 |
| 2020/0393998 A1* | 12/2020 | Su .................... | G06F 3/1256 |

FOREIGN PATENT DOCUMENTS

| | | | |
|---|---|---|---|
| JP | 2008304603 A | * | 12/2008 |
| JP | 2018132682 A | | 8/2018 |

* cited by examiner

*Primary Examiner* — Moustapha Diaby
(74) *Attorney, Agent, or Firm* — ROSSI, KIMMS & McDOWELL LLP

(57) ABSTRACT

There is provided an information processing system comprising: an obtaining unit configured to obtain read image data generated by reading an image printed on a sheet by a printing apparatus; and a controller configured to determine an abnormality of the printing apparatus by determining, based on the read image data obtained by the obtaining unit, a type of a stain that appears in the read image data from among a plurality of stain types.

10 Claims, 12 Drawing Sheets

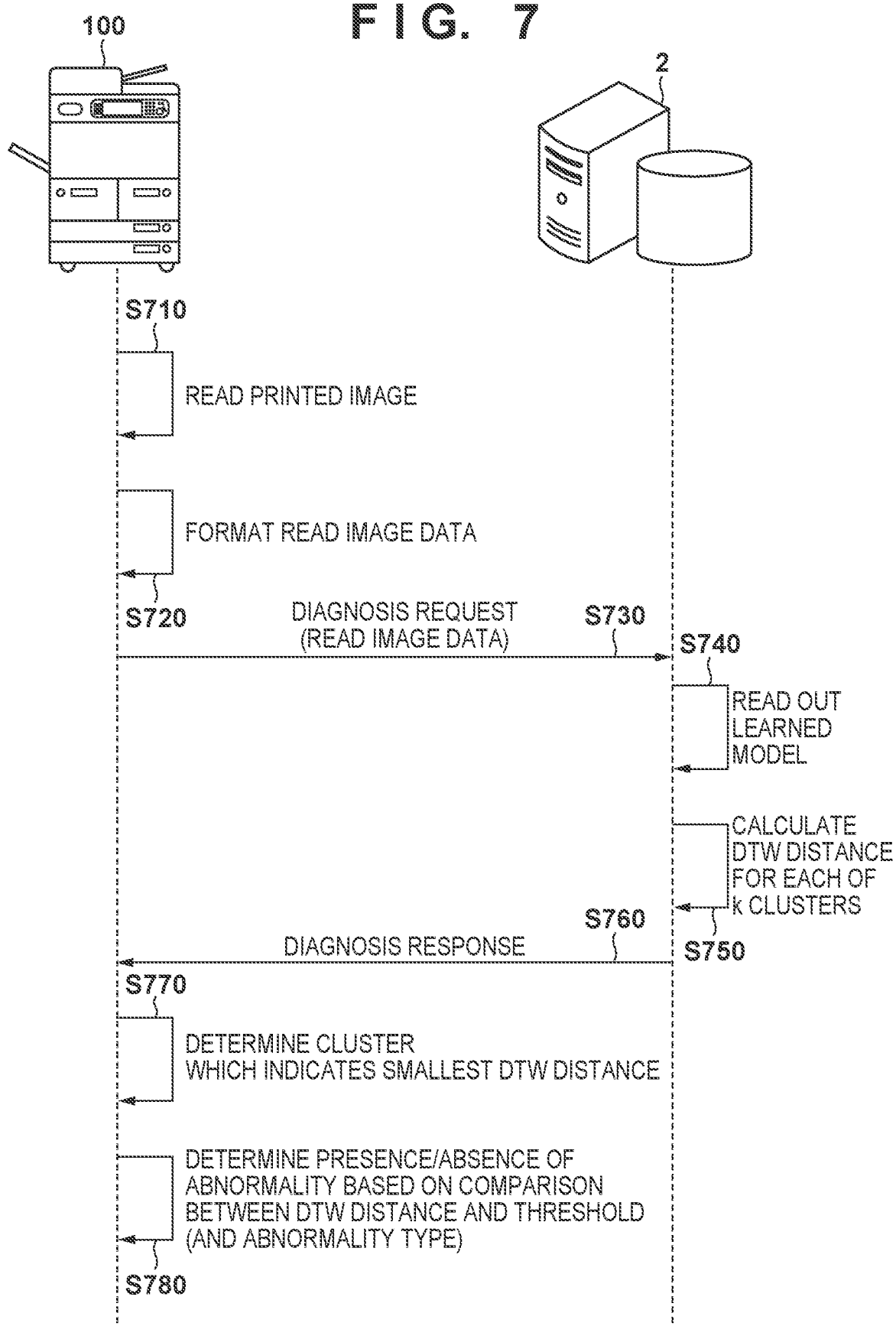

FIG. 8A

```
TONER IS ADHERING TO FIXING DEVICE [E01]
PLEASE CLEAN FIXING DEVICE BY FOLLOWING PROCEDURE.
-----------------------------------------
<ADJUSTMENT/
 MAINTENANCE>  → <MAINTENANCE>

→ <CLEANING OF FIXING DEVICE>      [ OK ]
```
— 801

FIG. 8B

```
TIME TO REPLACE PROCESS CARTRIDGE HAS ARRIVED [E02]
PLEASE REPLACE IT WITH NEW PROCESS CARTRIDGE.

```
ADF UNIT IS STAINED [E03]
PLEASE CLEAN ADF UNIT BY FOLLOWING PROCEDURE.
-----------------------------------------
<ADJUSTMENT/
 MAINTENANCE>  → <MAINTENANCE>

→ <CLEANING OF ADF UNIT>           [ OK ]
```
— 803

FIG. 8D

```
ABNORMALITY IS NOT DETECTED IN PRINTED IMAGE.
WHEN THERE IS SUSPECTED ABNORMALITY,
PLEASE PRINT TEST IMAGE BY FOLLOWING PROCEDURE TO
RE-DIAGNOSE OR CONFIRM USER GUIDE.
-----------------------------------------
<ADJUSTMENT/
 MAINTENANCE>  → <MAINTENANCE>

→ <PRINTING OF TEST IMAGE>         [ OK ]
```
— 804

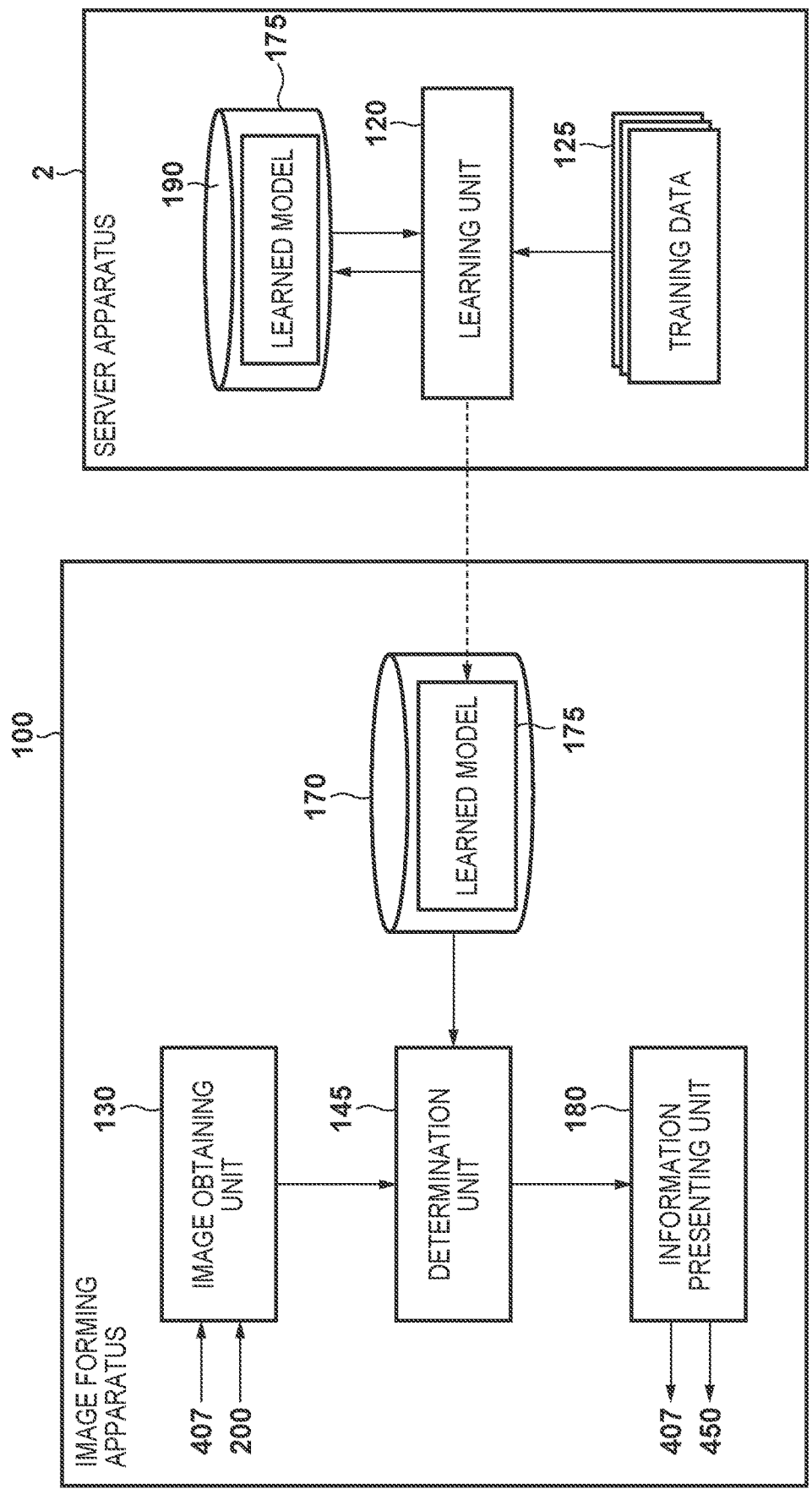

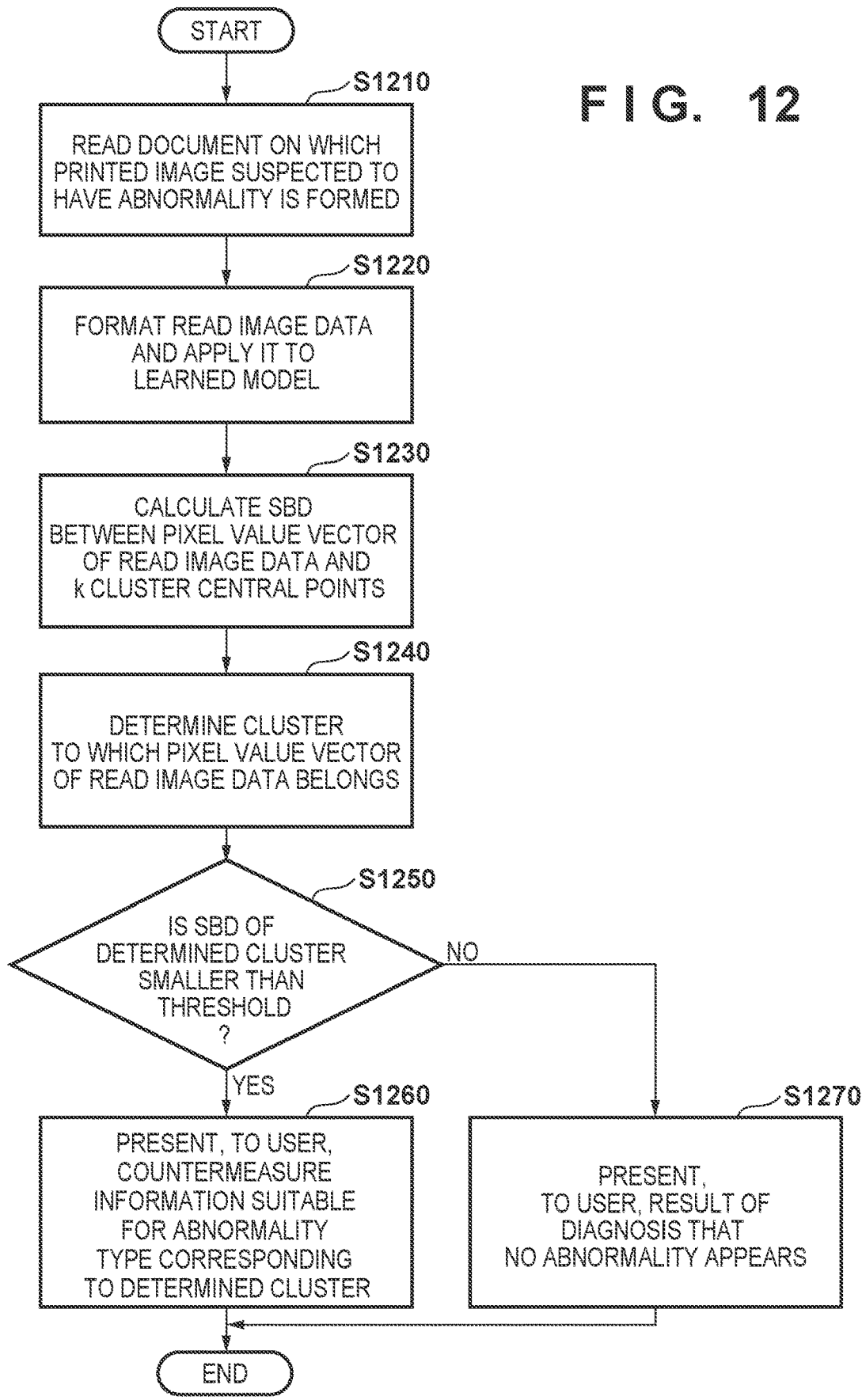

… # INFORMATION PROCESSING SYSTEM

The present disclosure relates to an information processing system.

BACKGROUND OF THE INVENTION

Field of the Invention

The present disclosure relates to an information processing system and method, and an image forming apparatus.

Description of the Related Art

While the performance of image forming apparatuses such as copiers, printers, facsimiles, and multifunction peripherals has improved over the years, abnormalities still occasionally appear in printed images due to various causes such as the deterioration of components or adherence of foreign objects. A user who recognizes an abnormality in a printed image can eliminate the cause of the abnormality by, for example, replacing or cleaning the components.

Japanese Patent Laid-Open No. 2018-132682 discloses a technique which focuses particularly on vertical streaking, which is a type of abnormality that appears in printed images, and determines which component in an image forming unit caused the vertical streaking based on the density of a vertical streak part in a test image.

SUMMARY OF THE INVENTION

However, a variety of abnormalities aside from vertical streaking can arise in printed images in situations of practical use. For example, abnormalities such as black spots, printing dilution, or the appearance of unwanted lines have different causes, and thus the countermeasure the user should take to deal with the abnormalities differs depending on the cause. The technique disclosed in Japanese Patent Laid-Open No. 2018-132682 does not handle these various types of abnormalities, and therefore only contributes little to user convenience.

Accordingly, the present disclosure provides a system that can analyze patterns of various abnormalities which can appear in a printed image and guide a user to use an appropriate countermeasure.

According to one aspect, there is provided an information processing system comprising: an obtaining unit configured to obtain read image data generated by reading an image printed on a sheet by a printing apparatus; and a controller configured to determine an abnormality of the printing apparatus by determining, based on the read image data obtained by the obtaining unit, a type of a stain that appears in the read image data from among a plurality of stain types. A corresponding method is also provided.

According to another aspect, there is provided an image forming apparatus comprising: an image forming device configured to form an image on a recording medium; a reading device configured to read the image formed on the recording medium and generate read image data; and processing circuitry configured to determine an abnormality of the image forming apparatus by determining, based on the read image data generated by the reading device, a type of a stain that appears in the read image data from among a plurality of stain types.

Further features of the present invention will become apparent from the following description of exemplary embodiments (with reference to the attached drawings).

BRIEF DESCRIPTION OF THE DRAWINGS

FIG. 7 is a sequence chart illustrating an example of the flow of state diagnosis processing according to the first embodiment.

FIG. 8A is a descriptive diagram illustrating a first example of countermeasure information that can be presented on a screen.

FIG. 8B is a descriptive diagram illustrating a second example of countermeasure information that can be presented on a screen.

FIG. 8C is a descriptive diagram illustrating a third example of countermeasure information that can be presented on a screen.

FIG. 8D is a descriptive diagram illustrating a fourth example of countermeasure information that can be presented on a screen.

FIG. 10 is a block diagram illustrating an example of the functional configurations of an image forming apparatus and a server apparatus according to a second embodiment.

FIG. 12 is a flowchart illustrating an example of the flow of state diagnosis processing according to the second embodiment.

DESCRIPTION OF THE EMBODIMENTS

Figure 1:
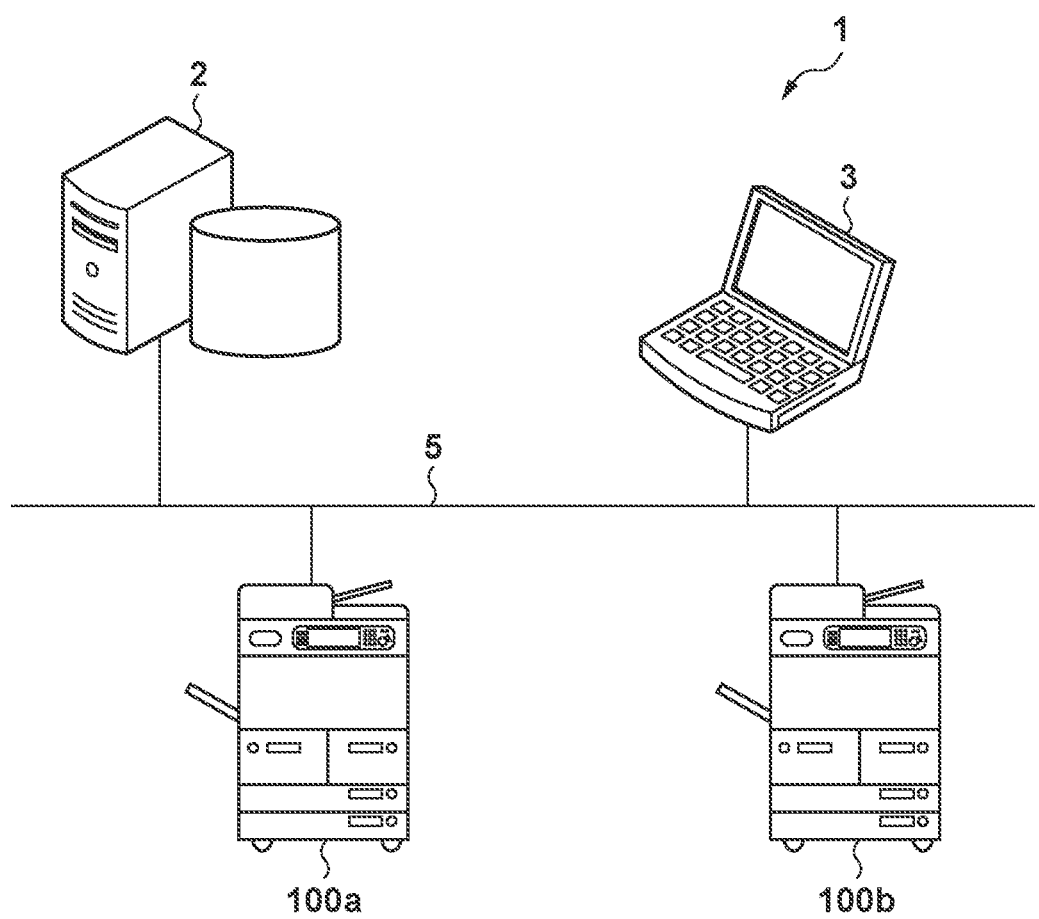
FIG. 1 is a schematic diagram illustrating an example of the configuration of an information processing system according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

1. SYSTEM OVERVIEW

The present specification will describe an example in which the technique according to the present disclosure is used in a system including an image forming apparatus (also called a "printing apparatus"). Generally speaking, the technique according to the present disclosure may be applied in a system including any type of image forming apparatus, such as, for example, printers, copiers, multifunction peripherals, and facsimiles, or in a system that works with such an image forming apparatus. Information processing such as the learning processing and inference processing described below may be executed by processing circuitry (e.g., processors, controllers, or computers) built into the image forming apparatus, or may be executed by the processing circuitry of another apparatus. Such an image forming apparatus and other apparatuses may both be referred to as "information processing apparatuses". Unless specified otherwise, the constituent elements such as apparatuses, devices, modules, and chips described below may be constituted by individual entities, or may be constituted by multiple physically-distinct entities.

FIG. 1 is a schematic diagram illustrating an example of the configuration of an information processing system 1 according to an embodiment. The information processing system 1 includes a server apparatus 2, a user terminal 3, an image forming apparatus 100a, and an image forming apparatus 100b. The server apparatus 2, the user terminal 3, the image forming apparatus 100a, and the image forming apparatus 100b are connected to each other over a network 5. The network 5 may be a wired network or a wireless network. The network 5 may be a combination of a plurality of sub-networks, such as the Internet and a Local Area Network (LAN), for example.

The server apparatus 2 is an information processing apparatus involved in diagnosing states of the image forming apparatuses. The server apparatus 2 may be implemented as, for example, a web server, an application server, a data server, or a cloud server. The user terminal 3 is a terminal apparatus used by a user of the information processing system 1. The user terminal 3 may be, for example, a general-purpose information terminal such as a personal computer (PC) or a smartphone, or may be a dedicated terminal specialized for a specific purpose.

The image forming apparatus 100a is an apparatus that provides, to the user, a variety of image processing functions, including an image forming function for forming an image (also called a "printing function") and a reading function for optically reading a document. The image forming apparatus 100b may be an image forming apparatus of the same type as the image forming apparatus 100a or of a different type from the image forming apparatus 100a. In the following, when there is no need to distinguish between the image forming apparatuses 100a and 100b, those apparatuses will be referred to simply as the "image forming apparatus 100".

Although FIG. 1 illustrates the two image forming apparatuses 100a and 100b, the information processing system 1 may include any number of image forming apparatuses. Similarly, although FIG. 1 illustrates one user terminal 3, the information processing system 1 may include any number of user terminals.

Upon being instructed to execute a job requiring image formation, such as printing or copying, the image forming apparatus 100 forms an image on a recording medium. In the following, the image formed on the recording medium will be called a "printed image". Abnormalities occasionally occur in printed images due to causes such as the deterioration of components or adherence of foreign objects, for example. A user who recognizes an abnormality in a printed image can eliminate the cause of the abnormality by using a countermeasure such as, for example, replacing the components or executing a cleaning function. However, it is not easy for the user to accurately determine which countermeasure is appropriate by looking at the printed image. Accordingly, in the embodiments described in more detail in the next sections, the system is assumed to incorporate a scheme that analyzes read image data generated by reading a printed image, determines the presence/absence of an abnormality or the type of abnormality in the printed image, and guides the user to use an appropriate countermeasure.

2. FIRST EMBODIMENT 2-1. Configuration of Image Forming Apparatus

Figure 2:
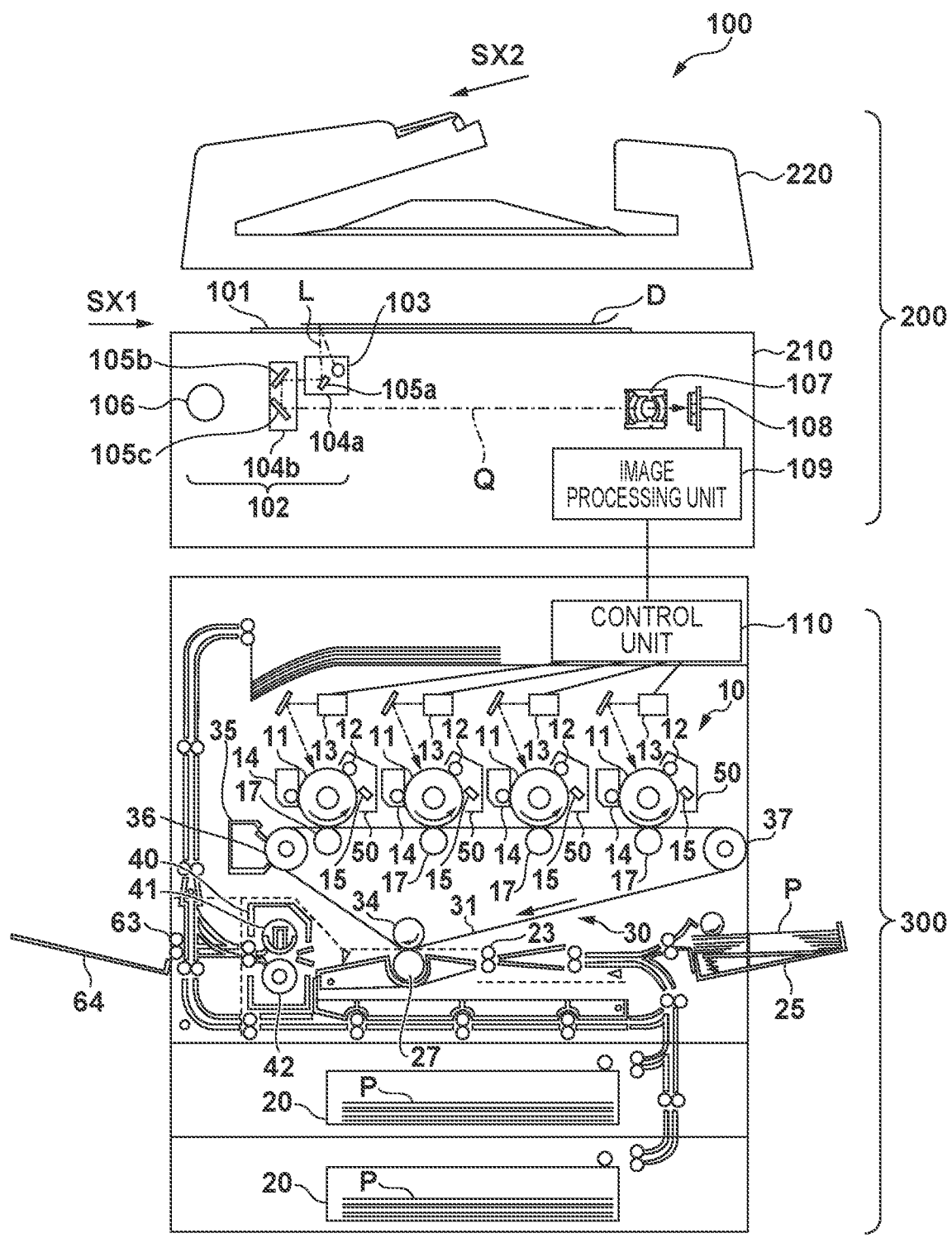
FIG. 2 is a schematic diagram illustrating an example of a specific configuration related to an image forming function and a reading function of an image forming apparatus according to a first embodiment.

FIG. 2 is a schematic diagram illustrating an example of a specific configuration related to the image forming function and the reading function of the image forming apparatus 100 according to a first embodiment. Referring to FIG. 2, the image forming apparatus 100 includes a reader 200 and a printer 300. The reader 200 is a reading device that reads a document and generates read image data. The printer 300 is an image forming device that forms an image on a recording medium. The reader 200 is disposed above the printer 300, and is connected to the printer 300 by signal lines. When the image forming apparatus 100 performs copying operations, the read image data generated by the reader 200 is transferred to the printer 300, and an image based on the read image data is formed on a recording medium by the printer 300.

(1) Example of Configuration Related to Image Forming Function

The printer 300 includes a plurality of members involved in image formation and a control unit 110 that controls the operations of those members. The control unit 110 obtains image data of an image to be printed from different data sources according to the type of the job, and executes the image formation job based on the obtained image data. Here, the printer 300 is assumed to be configured to form color images or monochromatic images through the electrophotographic method.

The printer 300 includes an image forming engine (image forming device) 10 that includes sub-units which form images for each of four color components, namely yellow (Y), magenta (M), cyan (C), and black (K), from left to right in the drawing. Each sub-unit includes a photosensitive drum 11. Each sub-unit further includes a charging roller 12, an exposure device 13, a developing device 14, a primary transfer roller 17, and a drum cleaner 15, which are provided around the photosensitive drum 11.

When image forming operations are started, the photosensitive drum 11 rotates in the direction of the arrow in the drawing. The charging roller 12 uniformly charges the surface of the photosensitive drum 11. The exposure device 13 forms an electrostatic latent image on the photosensitive drum 11 by exposing the surface of the photosensitive drum 11 with a laser beam modulated according to input image data. The developing device 14 develops a toner image from the electrostatic latent image by supplying toner to the electrostatic latent image. The primary transfer roller 17 performs a primary transfer of the toner image formed on the photosensitive drum 11 onto an intermediate transfer belt 31. The drum cleaner 15 puts the photosensitive drum 11 into a state in which the next image can be formed by removing toner left on the photosensitive drum 11 after the transfer. The drum cleaner 15 may be configured such that, for example, a cleaning blade formed from an elastic material makes contact with the surface of the photosensitive drum 11, or may be configured such that toner is collected by bringing a fur brush into contact with the surface of the photosensitive drum 11.

The printer 300 further includes a secondary transfer device 27, the intermediate transfer belt 31, and a transfer cleaner 35. The intermediate transfer belt 31 is an image carrier that carries the toner image transferred from the photosensitive drum 11. The intermediate transfer belt 31 is stretched upon three rollers 34, 36, and 37. The secondary transfer device 27 is disposed on the opposite side from the roller 34, with the intermediate transfer belt 31 located therebetween. The intermediate transfer belt 31 revolves in what is the clockwise direction in the drawing due to the rotation of the rollers 34, 36, and 37, and transports the toner image to a secondary transfer position located between the roller 34 and the secondary transfer device 27. The transfer cleaner 35 is disposed on the opposite side from the roller 36, with the intermediate transfer belt 31 located therebetween.

The printer 300 further includes at least one paper feed cassette 20 and a manual feed tray 25. The paper feed cassette 20 holds a bundle of sheets P. Each sheet P is fed from the paper feed cassette 20 or the manual feed tray 25 to a transport path, and is transported along the transport path to a resist roller pair 23. The resist roller pair 23 stops the transported sheet P once and corrects skew in the sheet P. The resist roller pair 23 feeds the sheet P to the secondary transfer position in accordance with the timing at which the toner image carried on the intermediate transfer belt 31 reaches the secondary transfer position. The secondary transfer device 27 transfers the toner image on the intermediate transfer belt 31 onto the sheet P. The transfer cleaner 35 removes toner left on the intermediate transfer belt 31.

The printer 300 further includes a fixing device 40, a discharge roller 63, and a discharge tray 64. The sheet P onto which the toner image has been transferred is transported to the fixing device 40. The fixing device 40 fixes the toner image onto the sheet P by, for example, heating and melting the toner image using a fixing roller 41 and further applying pressure using a pressurizing roller 42. The sheet P on which the image is formed in this manner is discharged to the discharge tray 64 by the discharge roller 63.

A process cartridge 50 is a replaceable (removable from the image forming apparatus 100) cartridge that includes, for example, the photosensitive drum 11, the charging roller 12, and the drum cleaner 15. When a malfunction occurs in the photosensitive drum 11, the charging roller 12, or the drum cleaner 15, a user or serviceperson can easily eliminate the malfunction with little downtime by replacing the process cartridge 50. Similarly, a transfer unit 30 can be a replaceable unit that includes, for example, the primary transfer roller 17 and the intermediate transfer belt 31. When a malfunction occurs in the primary transfer roller 17 or the intermediate transfer belt 31, a user or serviceperson can easily eliminate the malfunction with little downtime by replacing the transfer unit 30. Furthermore, other members such as the developing device 14 and the transfer cleaner 35 may also be replaceable in the image forming apparatus 100.

(2) Example of Configuration Related to Reading Function

The reader 200 includes a scanner unit 210 and an automatic document feed (ADF) unit 220. A document platform glass 101 is provided on a top face of the scanner unit 210. The ADF unit 220 feeds a document in a feed direction SX2. The scanner unit 210 includes an optical system 102, a lens unit 107, an image sensor 108, and an image processing unit 109. In the present embodiment, the reader 200 supports two reading modes for reading a document. The first reading mode is a mode in which the scanner unit 210 reads a document which is fed by the ADF unit 220. The first reading mode can be referred to as a "flowing reading mode" or an "ADF reading mode". The second reading mode is a mode in which the scanner unit 210 reads a document D placed on the document platform glass 101. The second reading mode can be referred to as a "fixed reading mode" or a "document platform reading mode".

The optical system 102 of the scanner unit 210 includes a first mirror unit 104a, a second mirror unit 104b, and a motor 106. The first mirror unit 104a includes a lamp 103 and a first mirror 105a. The second mirror unit 104b includes a second mirror 105b and a third mirror 105c. The first mirror unit 104a and the second mirror unit 104b are driven by the motor 106 and can move in a direction SX1.

In the flowing reading mode, the motor 106 moves the first mirror unit 104a and the second mirror unit 104b to a flowing reading position L and then stops those units. The flowing reading position L is below the document platform glass 101. The lamp 103 illuminates the document that has been transported by the ADF unit 220 and has reached the flowing reading position L. The first mirror 105a, the second mirror 105b, and the third mirror 105c guide light reflected from the read surface of the document in the direction of the lens unit 107 along an optical path Q, which is indicated by a dot-dash line in the drawing.

In the fixed reading mode, the motor 106 first moves the first mirror unit 104a and the second mirror unit 104b to a home position. A single document is placed on the document platform glass 101 with the read surface facing toward the document platform glass 101. The ADF unit 220 presses and secures the document placed on the document platform glass 101. When reading begins, the motor 106 moves the first mirror unit 104a and the second mirror unit 104b in the direction SX1. During this period, the lamp 103 illuminates the read surface of the document, and the first mirror 105a, the second mirror 105b, and the third mirror 105c guide light reflected from the read surface of the document in the direction of the lens unit 107 along the optical path Q.

In either reading mode, the lens unit 107 forms image light, which has passed through the optical system 102, as an image on a light-receiving surface of the image sensor 108. The image sensor 108 converts the image light incident on the light-receiving surface into an electrical signal. The image processing unit 109 converts the electrical signal output from the image sensor 108 into image data. The image processing unit 109 may perform image processing on the image data, such as, for example, color space conversion, noise removal, and tone correction.

(3) Example of Overall Hardware Configuration

Figure 3:
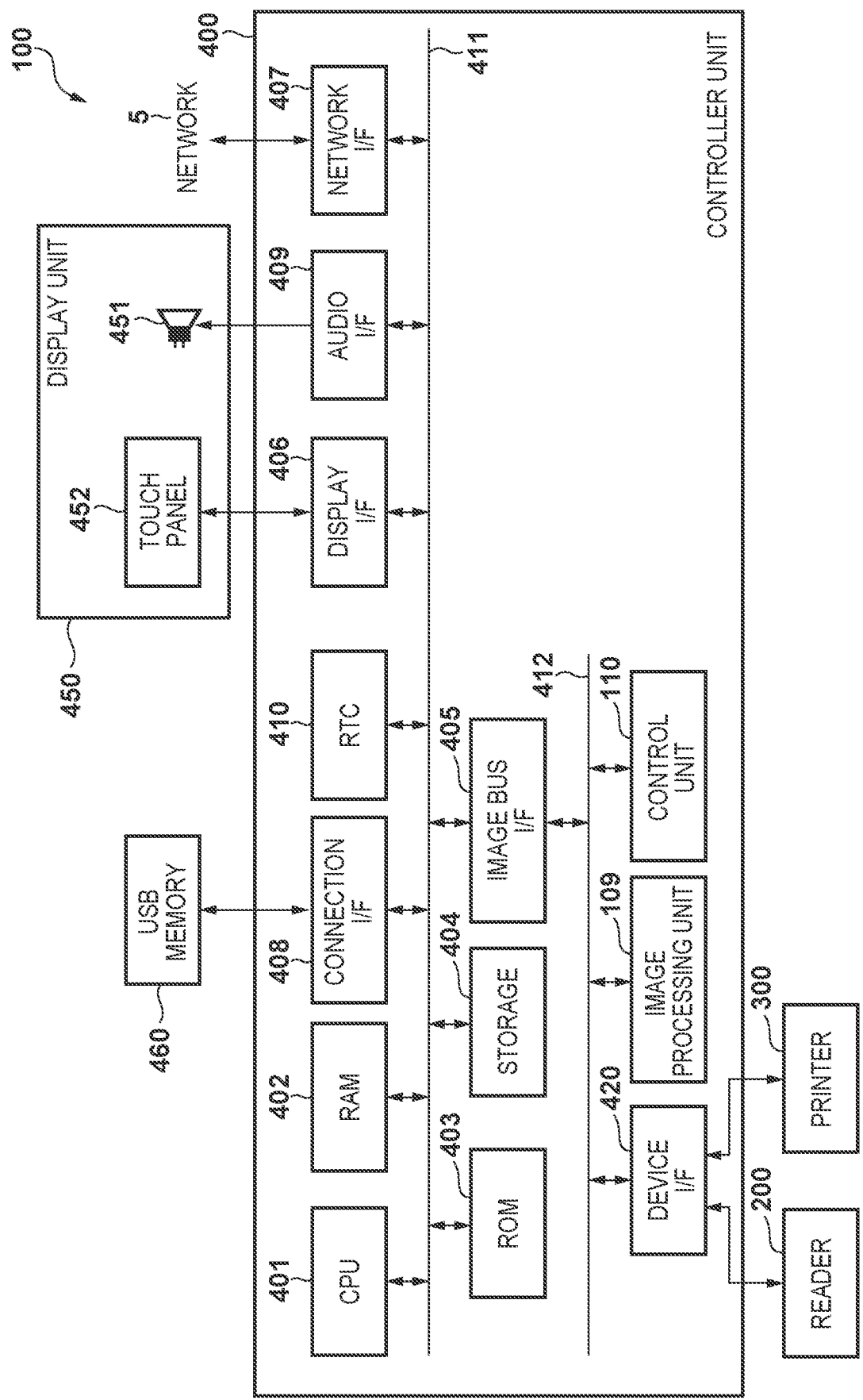
FIG. 3 is a schematic diagram illustrating an example of the hardware configuration of the image forming apparatus according to the first embodiment.

FIG. 3 is a schematic diagram illustrating an example of the hardware configuration of the image forming apparatus 100 according to the present embodiment. Referring to FIG. 3, the image forming apparatus 100 includes the reader 200, the printer 300, a controller unit 400, and a display unit 450. The controller unit 400 includes a CPU 401, a RAM 402, a ROM 403, storage 404, an image bus I/F 405, a display I/F 406, a network I/F 407, a connection I/F 408, an audio I/F 409, and an RTC 410. The CPU 401, the RAM 402, the ROM 403, the storage 404, the image bus I/F 405, the display I/F 406, the network I/F 407, the connection I/F 408, the audio I/F 409, and the RTC 410 are connected to each other by a system bus 411.

The Central Processing Unit (CPU) 401 executes a boot program stored in advance in the ROM 403 and starts up an operating system (OS) of the image forming apparatus 100. The CPU 401 controls the overall functionality of the image forming apparatus 100 by executing various computer programs stored in the storage 404 on this OS. The Random Access Memory (RAM) 402 provides the CPU 401 with a storage region for work and temporarily stores image data. The Read-Only Memory (ROM) 403 is a non-volatile storage medium that stores the boot program described above and related configuration data. The storage 404 stores at least one computer program and a variety of data such as control data, image data, and application data. The image bus interface (I/F) 405 is a bus bridge that connects an image bus 412 to the system bus 411 and has a function for converting the data format of image data. The display I/F 406 is an interface for connecting a touch panel 452 of the display unit 450 to the system bus 411. The network I/F 407 is a communication interface for the image forming apparatus 100 to communicate with other apparatuses over the network 5. The network I/F 407 may be a wired communication interface or a wireless communication interface. The connection I/F 408 is an interface for connecting an external memory to the image forming apparatus 100 in a removable manner. In the example in FIG. 3, the connection I/F 408 is a Universal Serial Bus (USB) interface, and a USB memory 460 is connected to the connection I/F 408. The audio I/F 409 is an interface for connecting a speaker 451 of the display unit 450 to the system bus 411. The Real-Time Clock (RTC) 415 is a clock that measures time.

The controller unit 400 further includes a device I/F 420, the image processing unit 109, and the control unit 110. The image bus I/F 405, the device I/F 420, the image processing unit 109, and the control unit 110 are connected to each other by the image bus 412. The image bus 412 complies with a communication standard such as PCI or IEEE 1394, for example, and can transfer image data at high speeds. The device I/F 420 is an interface for connecting the reader 200 and the printer 300 to the controller unit 400.

The display unit 450 includes the speaker 451 and the touch panel 452. The speaker 451 is connected to the audio I/F 409 of the controller unit 400. The speaker 451 outputs audio (e.g., voice which reads aloud information to be presented to the user) based on an audio signal output from the controller unit 400, for example. The touch panel 452 is connected to the display I/F 406 of the controller unit 400. The touch panel 452 can accept operations and information inputs made by a user, and can also display images and information. Note that the configuration of the display unit 450 of the image forming apparatus 100 is not limited to the examples described above. The display unit 450 may include a microphone that accepts audio input from the user. The image forming apparatus 100 may also include a simpler display device, such as several light-emitting diodes (LEDs) or a seven-segment display, for example.

2-2. Examples of Abnormalities in Printed Images

Figure 4:
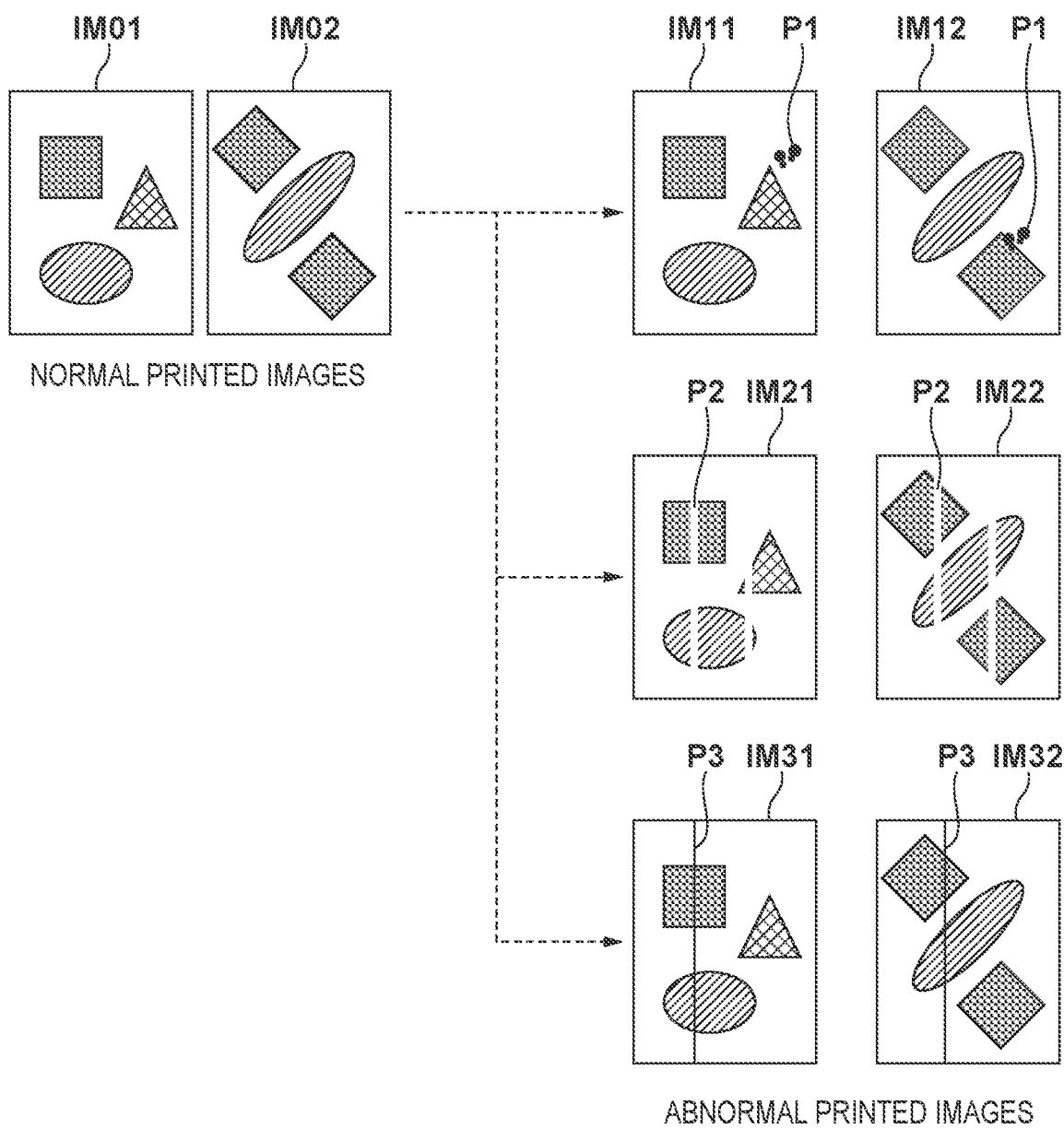
FIG. 4 is a descriptive diagram illustrating several examples of abnormalities appearing in printed images.

FIG. 4 is a descriptive diagram illustrating several examples of abnormalities that can appear in printed images formed by the printer 300 of the image forming apparatus 100. Images IM01 and IM02 in the upper-left corner are both examples of normal printed images. On the other hand, images IM11, IM12, IM21, IM22, IM31, and IM32 on the right are examples of printed images in which abnormalities have appeared. As illustrated in FIG. 4, there are several visible patterns of abnormalities that appear in printed images, and what kind of pattern appears depends primarily on the cause of the abnormality. Three types of patterns of abnormalities will be described here.

(1) Point-Like Smudges

The first abnormality pattern is a point-like smudge. Typically, point-like smudges appear in a printed image as stains consisting of small black points or clusters of points. In the example in FIG. 4, a point-like smudge P1 appears in the printed images IM11 and IM12. The cause of the point-like smudges may be, for example, a stain on the fixing roller 41. For example, as the printer 300 repeats image forming operations, toner may adhere to the surface of the fixing roller 41. This toner further transfers to the recording medium, which results in the appearance of a point-like smudge in the printed image. If a point-like smudge appears in the printed image, causing cleaning paper to pass through the fixing device 40 to transfer toner remaining on the surface of the fixing roller 41 to the cleaning paper, which restores the fixing roller 41 to its normal state, is one possible example of a countermeasure. Replacing the fixing device 40 or, if the fixing device 40 is equipped with a cleaning member, cleaning the fixing roller 41 using the cleaning member, are other possible examples of countermeasures.

(2) Linear Dilution

The second abnormality pattern is linear dilution. Typically, linear dilution appears in a printed image as a white (or light-colored) line in a colored region. In the example in FIG. 4, linear dilution P2 appears in the printed images IM21 and IM22. The cause of the linear dilution may be damage to the photosensitive drum 11 in the process cartridge 50, for example. For example, if the photosensitive drum 11 is damaged, the laser beam with which the photosensitive drum 11 is irradiated will be shielded at the position of the damage, which causes toner loss along the direction orthogonal to the scanning direction of the laser beam and resulting in the appearance of linear dilution in the printed image. If linear dilution appears in a printed image, replacing the process cartridge 50 is one possible example of a countermeasure. If the process cartridge 50 is integrated with a toner cartridge, it is necessary to replace the toner cartridge.

(3) Linear Stains

The third abnormality pattern is linear stains. Typically, linear stains appear in a printed image as black lines that span roughly the entirety of the sheet P in the length direction. In the example in FIG. 4, a linear stain P3 appears in the printed images IM31 and IM32. The cause of the linear stain may be, for example, a stain on the ADF unit 220. For example, as the ADF unit 220 repeatedly performs document transport operations, dirt such as dust or ink may adhere to the internal rollers of the ADF unit 220. This dirt is read and then printed during copying, resulting in the appearance of a linear stain in the printed image. If a linear stain appears in a printed image, operating a cleaning function provided in the ADF unit 220 is one possible countermeasure. The user opening the ADF unit 220 and wiping the dirt from the internal rollers with a cloth is another possible example of a countermeasure.

Although the three types of abnormality patterns in printed images have been given as examples here, the technique described in the present disclosure may of course be applied to other types of abnormality patterns as well. As can be understood from the foregoing descriptions, if the cause of the abnormality is the same, the visual patterns of the abnormalities appearing in the printed images will be similar to each other to some extent. In other words, the visual pattern of an abnormality appearing in a printed image is primarily a pattern dependent on the cause of the abnormality. In the present embodiment, such abnormality patterns are learned through a machine learning system, and the presence/absence of an abnormality and the type of the abnormality are determined using a learned model without relying on the subjective judgment of the user.

2-3. Example of Functional Configuration

Figure 5:
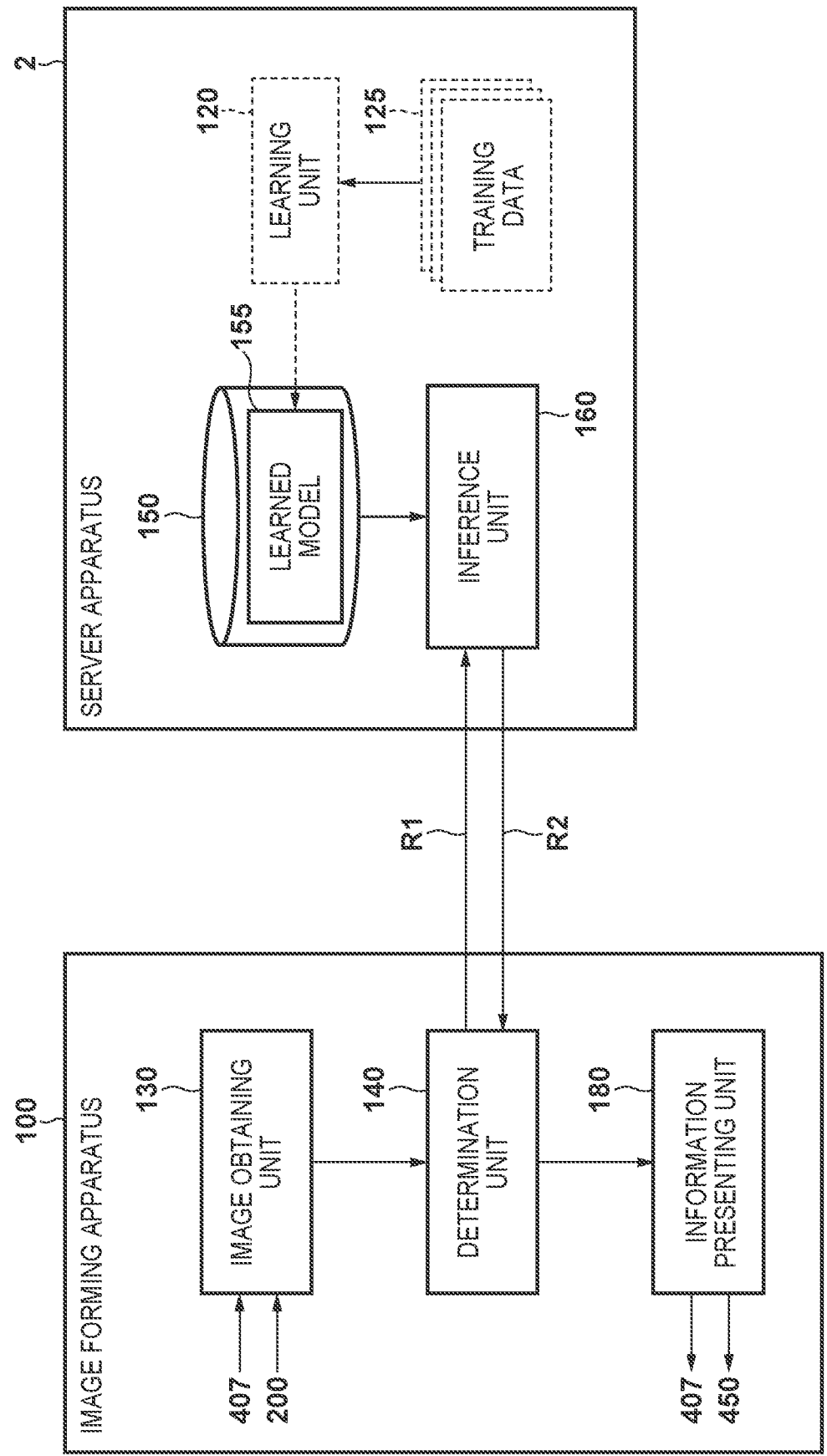
FIG. 5 is a block diagram illustrating an example of the functional configurations of the image forming apparatus and a server apparatus according to the first embodiment.

FIG. 5 is a block diagram illustrating an example of the functional configurations of the image forming apparatus 100 and the server apparatus 2 according to the present embodiment. Referring to FIG. 5, the image forming apparatus 100 includes an image obtaining unit 130, a determination unit 140, and an information presenting unit 180. The image obtaining unit 130, the determination unit 140, and the information presenting unit 180 may be, for example, functional modules embodied by the above-described processing circuitry of the image forming apparatus 100 (e.g., the CPU 401 and/or the control unit 110) executing computer programs. The server apparatus 2 also includes a storage unit 150 and an inference unit 160. The inference unit 160 may be, for example, a functional module embodied by the processing circuitry of the server apparatus 2 executing a computer program stored in a memory. FIG. 5 illustrates an example where the server apparatus 2 further includes a learning unit 120. In other embodiments, the learning unit 120 may be present in an apparatus different from the server apparatus 2.

(1) Learning Processing

The learning unit 120 executes learning processing for acquiring a learned model before the image forming apparatus 100 is used by the user. The learning processing can be performed, for example, using a large number of printed image samples that are produced on a trial basis during the development or manufacturing phase of the image forming apparatus 100. In the present embodiment, the learning processing is performed by clustering multidimensional pixel value vectors of a plurality of printed images into clusters respectively corresponding to k (where k is an integer greater than or equal to 2) abnormality types through cluster analysis. The k abnormality types may be, for example, at least two of the above-described point-like smudges, linear dilution, and linear stains. Here, the abnormality type candidates are assumed to include these three types (i.e., k=3).

FIG. 5 illustrates training data 125 that is input in the learning processing performed by the learning unit 120. The training data 125 may be a collection of image data of a plurality of printed images, each having a known abnormality type. For example, the training data 125 can be image data of 1,000 printed images for each abnormality type, i.e., a total of 3,000 printed images. If the size of each image is 120 pixels×90 pixels, a pixel value vector of a bitmap of one printed image (a binary image or a grayscale image) is a vector of 10800 dimensions. While using grayscale images enables highly accurate determination of abnormalities by taking into account shading of the image, using binary images reduces the burden of computation and communication and enables rapid determination. The learning unit 120 can, for example, use the k-means method to classify the 3,000 pixel value vectors in the training data 125 into three clusters, each corresponding to one of the three abnormality types. The k-means method requires, when assigning a cluster to each pixel value vector, calculating a distance between a cluster central point and that pixel value vector (expressing a similarity between images), and here, the Dynamic Time Warping (DTW) distance is used as this distance. By using the DTW distance as an indicator of the similarity between images, the degree of similarity between patterns can be robustly evaluated even in situations where the location of the abnormality pattern in images can shift or the spatial scale of the abnormality pattern can vary.

Figure 6:
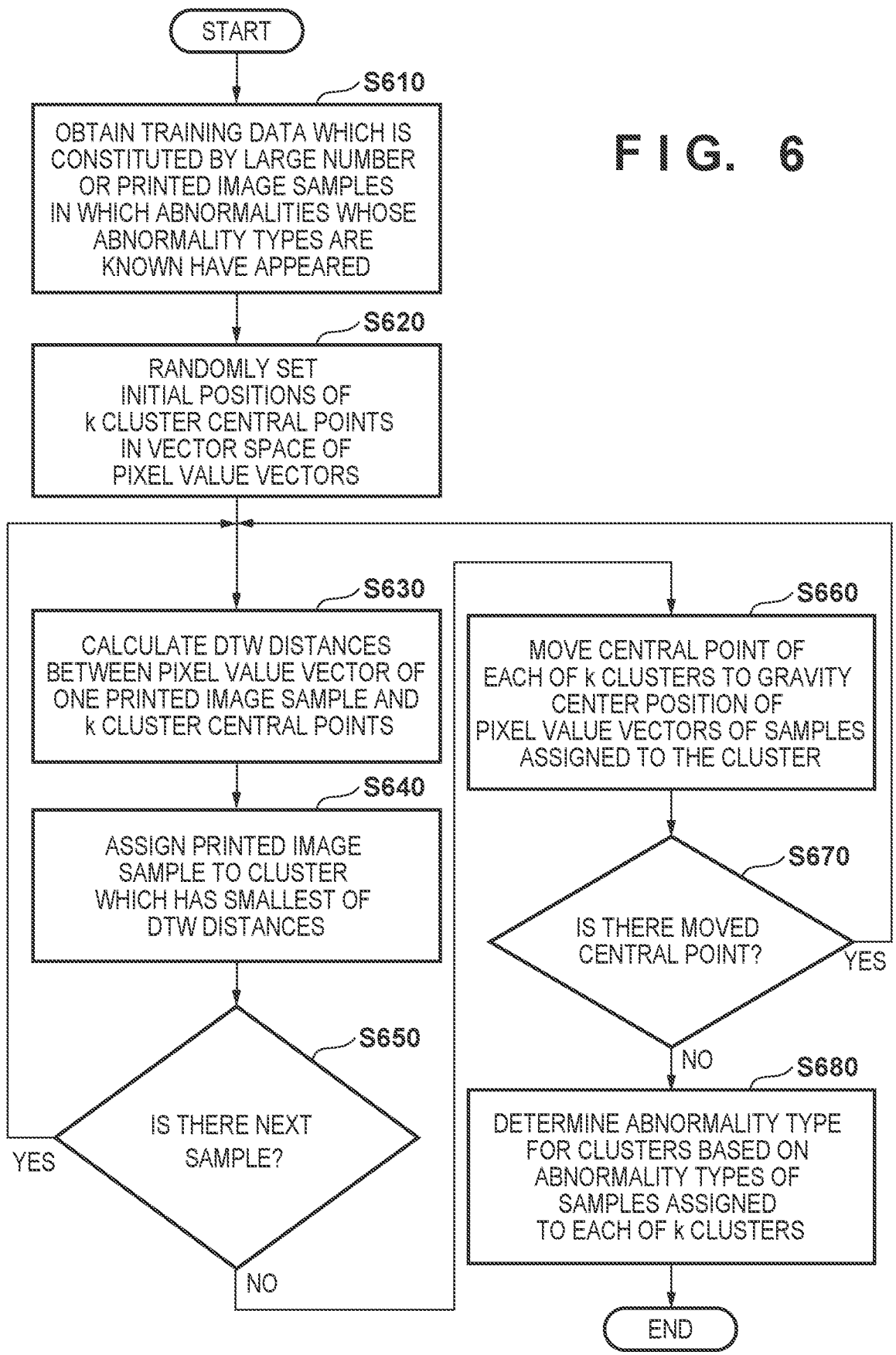
FIG. 6 is a flowchart illustrating an example of the flow of learning processing according to the first embodiment.

FIG. 6 is a flowchart illustrating an example of the flow of learning processing that can be executed by the learning unit 120 according to the present embodiment. Note that in the following descriptions, the processing steps are indicated by an S, indicating "step".

Referring to FIG. 6, first, in step S610, the learning unit 120 obtains the training data 125, which is constituted by a large number of printed image samples in which abnormalities whose abnormality types are known have appeared (e.g., 1000 samples for each abnormality type). The learning unit 120 plots the pixel value vector of each of the obtained printed image samples in a multidimensional (e.g., 10800-dimensional) vector space, for example.

Next, in step S620, the learning unit 120 randomly sets initial positions of k (e.g., k=3) cluster central points in the vector space where the pixel value vectors are plotted.

Next, in step S630, the learning unit 120 focuses on the pixel value vector of a single printed image sample (called a "vector of interest" hereinafter) and calculates the DTW distance between the vector of interest and the k cluster central points. Next, in step S640, the learning unit 120 assigns the printed image sample corresponding to the vector of interest to the cluster, among the k clusters, which has the smallest of the DTW distances calculated in step S630. Next, in step S650, the learning unit 120 determines whether a next printed image sample which is unprocessed remains in the training data 125. If a next printed image sample remains, the sequence returns to step S630, and steps S630 and S640 are repeated using the pixel value vector of the next printed image sample as the vector of interest. When a tentative cluster assignment has been completed for all the printed image samples, the sequence moves to step S660.

In step S660, the learning unit 120 moves the central point of each of the k clusters to a gravity center position of the pixel value vector of the printed image sample currently assigned to that cluster. Next, in step S670, the learning unit 120 determines whether at least one cluster central point has moved in step S660. If at least one cluster central point has moved, the sequence returns to step S630, and steps S630 and S640 are repeated for all the pixel value vectors, based on the new positions of the k cluster central points. If none of the cluster central points have ultimately moved in step S660 (i.e., the learning has converged), the repeated updating of the clusters is stopped and the sequence moves to step S680.

In step S680, the learning unit 120 determines the abnormality type for each of the k clusters based on the abnormality type of the printed image samples ultimately assigned to that cluster. For example, if the most common type, among the abnormality types of the printed image samples assigned to a first cluster, is a first type, the first cluster can be determined to be a cluster corresponding to the first type. Similarly, if the most common type, among the abnormality types of the printed image samples assigned to a second cluster, is a second type, the second cluster can be determined to be a cluster corresponding to the second type.

The learning unit 120 forms a learned model 155 by clustering the pixel value vectors of the large number of printed image samples included in the training data 125 in this manner, and stores the formed learned model 155 in the storage unit 150. The learned model 155 typically includes definitions of the locations of the central points of the clusters for each abnormality type in the pixel value vector space.

Note that the learning unit 120 may derive one learned model 155 for a plurality of image forming apparatuses 100 of the same type, or may derive one learned model 155 for one image forming apparatus 100. In the former case, the learning unit 120 stores the derived learned model 155 in the storage unit 150 in association with identification information identifying the type of the image forming apparatus 100. In the latter case, the learning unit 120 stores the derived learned model 155 in the storage unit 150 in association with identification information identifying that individual image forming apparatus 100.

(2) DTW Distance as Similarity A method for calculating the DTW distance, which is treated as an indicator of the similarity between images, according to the principles of dynamic programming will be described here. As an example, assume an N-dimensional pixel value vector space, where two pixel value vectors $p=(p_1, p_2, \ldots, p_N)$ and $q=(q_1, q_2, \ldots, q_N)$ belong to this pixel value vector space. A cost matrix C of size N×N is then determined by recursively deriving elements $c_{i,j}$, which represent cost values, from a starting point (i=1, j=1) to an end point (i=N, j=N), according to the following rules:

If i=1 and j=1 (the cost value of the starting point):
$c_{1,1}=0$
If i=1 or j=1:
$c_{1,j}=\infty, c_{i,1}=\infty$
If i≠1 and j≠1:

$$c_{i,j} = dist(p_i, q_i) + \min\begin{cases} c_{i-1,j-1} \\ c_{i,j-1} \\ c_{i-1,j} \end{cases}$$

where
$dist(p_i, q_i) = |p_i - q_i|$

When the entire cost matrix C is determined, a cost value $c_{N,N}$ of the end point indicates the DTW distance between pixel value vectors p and q. This DTW distance is equal to the sum of the cost values of a path, among the possible paths connecting the starting point to the end point of the cost matrix C, in which the sum of the cost values of the elements which the path follows is the lowest.

Intuitively, this dynamic programming method can be said to search for places where a pattern of increase and decrease in pixel values fits between vectors while scaling the array of pixel values. The DTW distance calculated in this manner is an indicator value which, even if the positions of characteristic patterns of abnormalities appearing in printed images shift or the spatial scale thereof changes, appropriately reflects the degree of similarity between the patterns.

(3) Obtainment of Image Data

The image obtaining unit 130 of the image forming apparatus 100 obtains the read image data of a printed image in which an abnormality may have appeared. As an example, the user sets a document on which a printed image is formed in the ADF unit 220 or on the document platform glass 101, and calls a state diagnosis function through a user interface (UI) displayed by the display unit 450. Then, the reader 200 reads the printed image on the set document and generates read image data. The image obtaining unit 130 can obtain the read image data generated in this manner. As another example, the image obtaining unit 130 may receive read image data, which has been generated by another apparatus reading a printed image, via the network I/F 407, along with a state diagnosis request. For example, if only the image forming apparatus 100a among the image forming apparatuses 100a and 100b has the state diagnosis function, the image forming apparatus 100a may receive the read image data from the image forming apparatus 100b. If the printed image subject to diagnosis is an image formed by another apparatus, the image obtaining unit 130 may obtain (e.g., through a UI or the network I/F 407) user input information identifying the type of the apparatus, or the individual apparatus itself, which formed the printed image. The image obtaining unit 130 outputs the obtained data to the determination unit 140.

(4) Inference and Determination

The determination unit 140 of the image forming apparatus 100 determines the type of abnormality that appears in a printed image from among a plurality of abnormality types based on the read image data obtained by the image obtaining unit 130. More specifically, in the present embodiment, the determination unit 140 transmits the read image data to the server apparatus 2 and receives, from the server apparatus 2, a result of applying the read image data to the above-described learned model 155 acquired in advance. The determination unit 140 then determines the type of the abnormality that appears in the printed image based on a result of applying the read image data.

The determination unit 140 formats the read image data (e.g., into bitmap data of a predetermined size), includes the formatted read image data in a diagnosis request R1, and transmits the diagnosis request R1 to the server apparatus 2 through the network I/F 407. The diagnosis request R1 is a request to apply the read image data to the learned model described above. The determination unit 140 may include, in the diagnosis request R1, identification information that identifies the type of the apparatus, or the individual apparatus itself, that formed the printed image.

Upon receiving the diagnosis request R1 from the image forming apparatus 100, the inference unit 160 of the server apparatus 2 reads out the learned model 155 corresponding to the identification information included in the diagnosis request R1 from the storage unit 150 and applies the read image data to the read-out learned model 155. For example, the inference unit 160 calculates the DTW distance between the pixel value vector of the read image data received from the image forming apparatus 100 and the central points of the k clusters defined by the learned model 155. The pixel value vector of the read image data can be determined to belong to the cluster corresponding to the central point, among the central points of the k clusters, that has the smallest of the DTW distances calculated here. The inference unit 160 then returns a diagnosis response R2 to the image forming apparatus 100. The diagnosis response R2 is a response corresponding to the diagnosis request R1, for providing, to the image forming apparatus 100, the result of applying the read image data to the learned model 155.

The determination unit 140 of the image forming apparatus 100 receives the diagnosis response R2 from the server apparatus 2 through the network I/F 407. The determination unit 140 determines that the type of the abnormality that appears in the printed image subject to the diagnosis is the abnormality type corresponding to the cluster, among the k clusters in the learned model 155, to which the pixel value vector of the read image data belongs. As an example, the diagnosis response R2 may include the DTW distance between the central point of each of the k clusters and the pixel value vector of the read image data (i.e., k values), as calculated by the inference unit 160. In this case, the determination unit 140 can determine to which abnormality type the cluster that indicates the smallest value among the k DTW distances included in the diagnosis response R2 corresponds. As another example, the diagnosis response R2 may include the smallest value among the k DTW distances and a cluster identifier identifying the cluster that indicates that smallest value. In this case, the determination unit 140 can determine the type of abnormality that appears in the printed image from the cluster identifier included in the diagnosis response R2.

The determination unit 140 may determine that no abnormality appears in the printed image subject to the diagnosis when the smallest distance of the central point of the cluster that indicates the smallest distance from the pixel value vector of the read image data exceeds a threshold (i.e., when the value is not so small as to correspond to an outlier). Here, the threshold may be set in advance, or may be set variably. For example, the determination unit 140 may set the stated threshold to the value of a distance corresponding to a predetermined deviation value (e.g., 30) when the k distances are used as a population. By determining whether a pixel value vector is significantly closer to the central point of a specific cluster based on such a threshold comparison in addition to comparing the magnitudes of the distances relatively among clusters, the possibility of erroneously detecting an abnormality in a printed image that does not actually have an abnormality can be reduced. Note that the determination of outliers is not limited to the example described above, and may be performed through any other method (e.g., a method based on a test method such as a null hypothesis test may be used).

FIG. 7 is a sequence chart illustrating an example of the flow of state diagnosis processing that can be executed in the information processing system 1 according to the present embodiment. The state diagnosis processing illustrated in FIG. 7 involves the image forming apparatus 100 and the server apparatus 2.

Referring to FIG. 7, first, in step S710, the image obtaining unit 130 of the image forming apparatus 100 is started up in response to the state diagnosis function being called, and instructs the reader 200 to read a printed image of a document set by the user. The image obtaining unit 130 then obtains the read image data of the printed image from the reader 200.

Next, in step S720, the determination unit 140 formats the read image data obtained by the image obtaining unit 130 for a diagnosis request to be made to the server apparatus 2. For example, the determination unit 140 converts the data format of the read image data to bitmap format and converts color images to grayscale images or monochromatic images as necessary.

Next, in step S730, the determination unit 140 transmits the diagnosis request, which includes the read image data, to the server apparatus 2 through the network I/F 407. The inference unit 160 of the server apparatus 2 receives the diagnosis request through a communication interface similar to the network I/F 407.

Next, in step S740, the inference unit 160 of the server apparatus 2 reads out, from the storage unit 150, the learned model 155 to which the read image data received from the image forming apparatus 100 should be applied. Next, in step S750, the inference unit 160 calculates the DTW distance between the cluster central point and the pixel value vector of the read image data for each of the k clusters by applying the read image data to the read-out learned model 155.

Next, in step S760, the inference unit 160 transmits a diagnosis response, which includes the values of DTW distances calculated in step S750, to the image forming apparatus 100 through the communication interface. The determination unit 140 of the image forming apparatus 100 receives the diagnosis response through the network I/F 407.

Next, in step S770, the determination unit 140 determines which of the k clusters indicates the smallest DTW distance in the diagnosis response. Next, in step S780, the determination unit 140 compares the DTW distance of the cluster determined in step S770 with the threshold for determining outliers. If the result of the comparison indicates that the DTW distance is smaller than the threshold, the determination unit 140 determines that an abnormality of the type corresponding to the cluster determined in step S770 appears in the printed image read in step S710. On the other hand, if the DTW distance is not smaller than the threshold, the determination unit 140 determines that no abnormality appears in the printed image.

Although an example in which the image forming apparatus 100 and the server apparatus 2 are involved in the state diagnosis processing has been described here, more apparatuses may be involved in the state diagnosis processing. For example, an apparatus that stores the learned model may be provided separately from the apparatus that applies the read image data to the learned model. The state diagnosis processing may also be performed by a single apparatus (e.g., an image forming apparatus or an image reading apparatus that stores the learned model locally).

(5) Presentation of Countermeasure Information

The information presenting unit 180 presents, to the user, countermeasure information indicating a countermeasure for dealing with the abnormality in the printed image, corresponding to the type determined by the determination unit 140. As one example, the information presenting unit 180 may present the countermeasure information to the user by displaying, on the screen of the display unit 450, a procedural description for dealing with the abnormality corresponding to the determined type. As another example, the information presenting unit 180 may display, in the display, a code that identifies a countermeasure for dealing with the abnormality corresponding to the determined type. The "display" in this case may be the display unit 450, or a simpler display such as a seven-segment display. As a further example, the information presenting unit 180 may present the countermeasure information to the user by lighting a light-emitting element (e.g., an LED) in a light emission pattern that identifies a countermeasure for dealing with the abnormality corresponding to the determined type. Here, the light emission pattern may be any combination of, for example, the color of the light emission, the number of elements emitting light, the duration of the light emission, and a cycle of flashing. As another example, the information presenting unit 180 may present the countermeasure information to the user by causing an audio output interface such as the speaker 451 to output audio representing a procedural description or a code identifying a countermeasure for dealing with the abnormality corresponding to the determined type. The information presenting unit 180 does not present the countermeasure information to the user when the determination unit 140 has determined that no abnormality appears in the printed image.

FIGS. 8A to 8D illustrate several examples of countermeasure information that can be presented on the screen of the touch panel 452 of the display unit 450. An information presentation screen 801 in FIG. 8A is a screen that can be displayed on the touch panel 452 when, as a result of the state diagnosis processing described above, it is determined that a point-like smudge appears in the printed image. The information presentation screen 801 includes text (e.g., written in natural language) notifying the user that toner is adhering to the fixing device and that it is recommended that the fixing device be cleaned. The information presentation screen 801 also includes a procedural description (in this case, a series of menu items to be selected) for operating a cleaning function for the fixing device. The user who sees this text and the procedural description can use the appropriate countermeasure for dealing with the abnormality without having to look at the printed image and determine the abnormality type themselves.

An information presentation screen 802 in FIG. 8B is a screen that can be displayed on the touch panel 452 when, as a result of the state diagnosis processing described above, it is determined that a linear dilution appears in the printed image. The information presentation screen 802 includes text notifying the user that the time when the process cartridge should be replaced has arrived and that replacing the process cartridge with a new cartridge is recommended.

An information presentation screen 803 in FIG. 8C is a screen that can be displayed on the touch panel 452 when, as a result of the state diagnosis processing described above, it is determined that a linear stain appears in the printed image. The information presentation screen 803 includes text notifying the user that the ADF unit is dirty and that it is recommended that the ADF unit be cleaned. The information presentation screen 803 also includes a procedural description for operating the cleaning function of the ADF unit.

An information presentation screen 804 in FIG. 8D includes text notifying the user that no abnormalities have been detected in the printed image as a result of the state diagnosis processing described above. Here, when no abnormality was detected in the printed image but it is still suspected that an abnormality is present, the information presenting unit 180 suggests, on the screen, that the user print a test image and re-execute the state diagnosis. The information presentation screen 804 also includes a procedural description for calling a function to print a test image. By re-executing the state diagnosis processing using the read image data of the printed test image instead of the normal printed image, the classification of the abnormality type becomes more accurate, and a highly-accurate state diagnosis result can be obtained.

The content of the information presentation screens 801 to 804 illustrated in FIGS. 8A to 8D are merely examples. Each information presentation screen may, for example, include only information indicating the determined abnormality type. Each information presentation screen may additionally include information for guiding the user to the corresponding pages of a user guide of the image forming apparatus 100. The information presenting unit 180 may transmit a message containing the text to be presented to the user to a remote apparatus (e.g., the user terminal 3 or another image forming apparatus) through the network I/F 407 and display the information presentation screen on the display of the remote apparatus.

FIGS. 9A to 9D illustrate several examples of presenting the countermeasure information using a seven-segment display, which can be implemented at a relatively low cost. A display 901 in FIG. 9A indicates how the seven-segment display displays an error code "E01", which corresponds to a point-like smudge, when it is determined that a point-like smudge appears in the printed image as a result of the state diagnosis processing described above. The error code "E01" is, for example, a code that identifies the countermeasure of operating the cleaning function of the fixing device. The error code may be any combination of letters, numbers, and symbols, for example. A user who sees such an error code can easily discover the appropriate countermeasure for dealing with the abnormality by referring to the corresponding page of the user guide, for example.

Figure 9A:
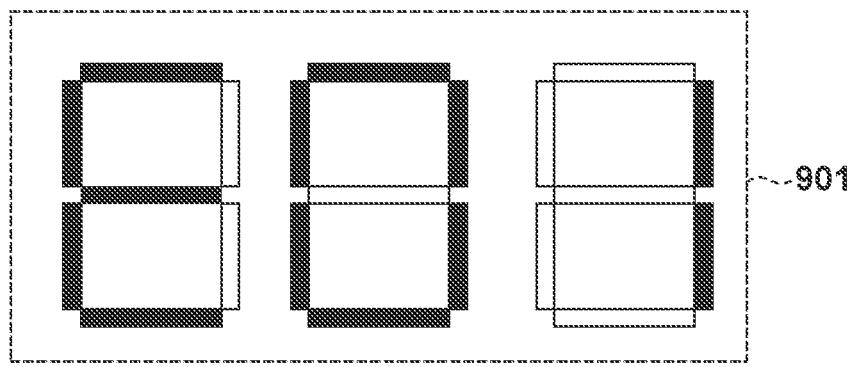
FIG. 9A is a descriptive diagram illustrating a first example of presenting countermeasure information using a seven-segment display.
Figure 9B:
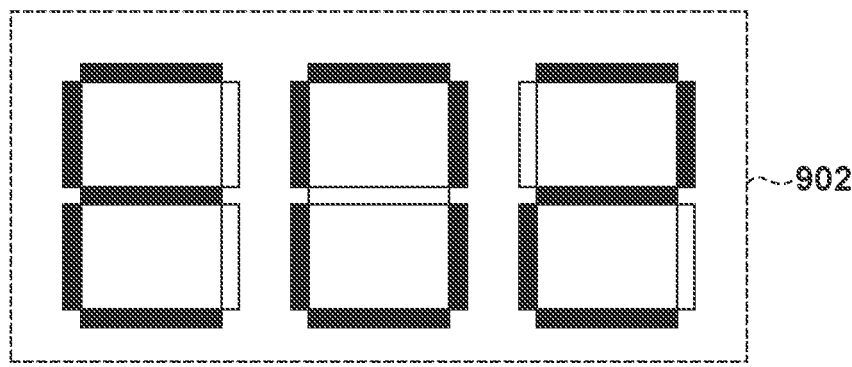
FIG. 9B is a descriptive diagram illustrating a second example of presenting countermeasure information using a seven-segment display.

A display 902 in FIG. 9B indicates how the seven-segment display displays an error code "E02", which corresponds to a linear dilution, when it is determined that a linear dilution appears in the printed image as a result of the state diagnosis processing described above. The error code "E02" is, for example, a code that identifies the countermeasure of replacing the process cartridge.

Figure 9C:
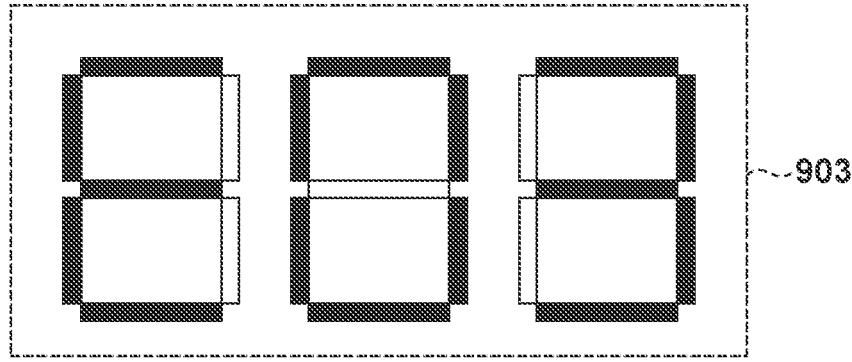
FIG. 9C is a descriptive diagram illustrating a third example of presenting countermeasure information using a seven-segment display.

A display 903 in FIG. 9C indicates how the seven-segment display displays an error code "E03", which corresponds to a linear stain, when it is determined that a linear stain appears in the printed image as a result of the state diagnosis processing described above. The error code "E03" is, for example, a code that identifies the countermeasure of operating the cleaning function of the ADF unit.

Figure 9D:
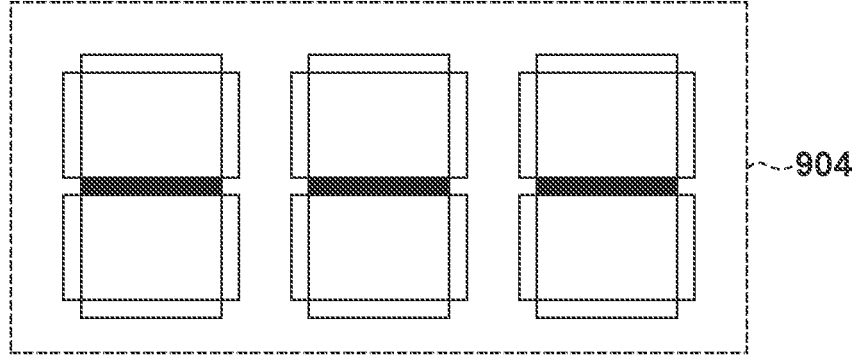
FIG. 9D is a descriptive diagram illustrating a fourth example of presenting countermeasure information using a seven-segment display.

A display 904 in FIG. 9D illustrates how the seven-segment display displays a code "---", which means there is no abnormality, when no abnormality is detected in the printed image as a result of the state diagnosis processing described above.

3. SECOND EMBODIMENT

In the first embodiment described in the previous section, it was assumed that the server apparatus 2 stores a learned model acquired in advance, and the image forming apparatus 100 transmits the diagnosis request R1 to the server apparatus 2. Meanwhile, in a second embodiment described in this section, it is assumed that the image forming apparatus 100 stores the learned model locally. Additionally, in the first embodiment, it was assumed that the learned model is acquired through clustering with the k-means method using the DTW distance. On the other hand, in the second embodiment, the k-shape method is assumed to be used instead of the k-means method. The features of the first and second embodiments described in the present specification may be combined with each other in any way. The image forming function and reading function of the image forming apparatus 100 according to the second embodiment may be configured in the same manner as in the example of the configuration described with reference to FIG. 2. Additionally, the hardware configuration of the image forming apparatus 100 according to the second embodiment may be the same as in the example of the configuration described with reference to FIG. 3.

FIG. 10 is a block diagram illustrating an example of the functional configurations of the image forming apparatus 100 and the server apparatus 2 according to the present embodiment. Referring to FIG. 10, the image forming apparatus 100 includes the image obtaining unit 130, a determination unit 145, a storage unit 170, and the information presenting unit 180. The image obtaining unit 130, the determination unit 145, and the information presenting unit 180 may be, for example, functional modules embodied by the above-described processing circuitry of the image forming apparatus 100 executing computer programs. The server apparatus 2 also includes the learning unit 120 and a storage unit 190.

(1) Learning Processing

The learning unit 120 of the server apparatus 2 performs learning processing for acquiring a learned model. In the present embodiment, too, the learning processing is performed by clustering multidimensional pixel value vectors of a plurality of printed images into clusters respectively corresponding to k (where k is an integer greater than or equal to 2) abnormality types through cluster analysis. As one example, assume that k=3, and that, for example, the point-like smudges, linear dilutions, and linear stains described above are candidates for abnormality types. All of these abnormality type candidates are abnormality types related to image formation by the image forming device of the image forming apparatus 100.

The learning unit 120 uses, for example, the k-shape method to classify the 3,000 pixel value vectors in the training data 125 into three clusters, each corresponding to one of the three abnormality types. As in the k-means method, in the k-shape method, a cluster is tentatively assigned to each pixel value vector, and the assignments of the clusters to pixel value vectors are iteratively updated such that the distance between the central point of each cluster and the pixel value vector belonging to that cluster is minimized. In the k-shape method, Shape-Based Distance (SBD) is used as the distance between the cluster central point and the pixel value vector, i.e., as an indicator of the similarity between images. By using the SBD as an indicator of the similarity between images, the degree of similarity between patterns can be robustly evaluated even in situations where the location of the abnormality pattern in images can shift or the shading of the abnormality pattern can vary.

Figure 11:
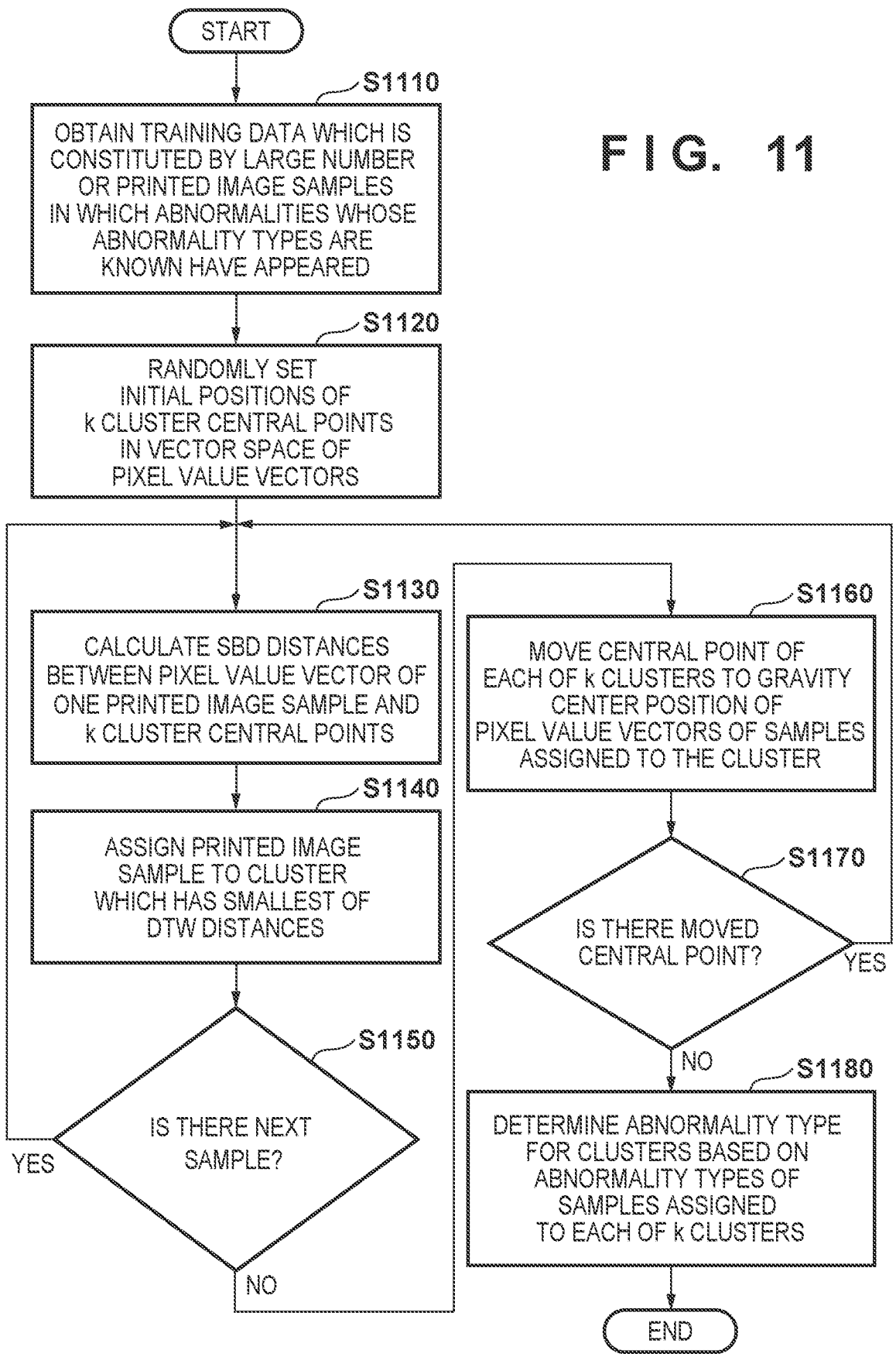
FIG. 11 is a flowchart illustrating an example of the flow of learning processing according to the second embodiment.

FIG. 11 is a flowchart illustrating an example of the flow of learning processing that can be executed by the learning unit 120 according to the present embodiment.

Steps S1110 and S1120 in FIG. 11 are the same processing steps as steps S610 and S620 described with reference to FIG. 6 and will therefore not be described here.

In step S1130, the learning unit 120 focuses on the pixel value vector of a single printed image sample and calculates the SBD distance between the vector of interest and the k cluster central points. Next, in step S1140, the learning unit 120 assigns the printed image sample corresponding to the vector of interest to the cluster, among the k clusters, which has the smallest of the SBDs calculated in step S1130. Next, in step S1150, the learning unit 120 determines whether a next printed image sample which is unprocessed remains in the training data 125. If a next printed image sample remains, the sequence returns to step S1130, and steps S1130 and S1140 are repeated using the pixel value vector of the next printed image sample as the vector of interest. When a tentative cluster assignment has been completed for all the printed image samples, the sequence moves to step S1160.

In step S1160, the learning unit 120 moves the central point of each of the k clusters to a gravity center position of the pixel value vector of the printed image sample currently assigned to that cluster. Next, in step S1170, the learning unit 120 determines whether at least one cluster central point has moved in step S1160. If at least one cluster central point has moved, the sequence returns to step S1130, and steps S1130 and S1140 are repeated for all the pixel value vectors, based on the new positions of the k cluster central points. If none of the cluster central points have moved in step S1160 (i.e., the learning has converged), the repeated updating of the clusters is stopped and the sequence moves to step S1180.

Step S1180 in FIG. 11 is the same processing step as step S680 described with reference to FIG. 6 and will therefore not be described here.

The learning unit 120 forms a learned model 175 by clustering the pixel value vectors of the large number of printed image samples included in the training data 125 in this manner, and stores the formed learned model 175 in the storage unit 190. The learned model 175 is incorporated into the storage unit 170 of the image forming apparatus 100, for example, when the image forming apparatus 100 is manufactured. The learned model 175 typically includes definitions of the locations of the central points of the clusters for each abnormality type in the pixel value vector space.

(2) SBD as Similarity A method for calculating the SBD, which is treated as an indicator of the similarity between images, will be described here. As an example, assume an N-dimensional pixel value vector space, where two pixel value vectors $p=(p_1, p_2, \ldots, p_N)$ and $q=(q_1, q_2, \ldots, q_N)$ belong to this pixel value vector space. For an integer s taking on a value in the range $[-m, m]$, a vector $p(s)$ obtained by shifting the elements of the vector p by s elements is defined as indicated by the following formula. A similar vector $g(s)$ is defined for a vector q.

$$p_{(s)} = \begin{cases} 0, \ldots, 0, p_1, p_2, \ldots, p_{N-s} & (s \geq 0) \\ p_{1-s}, \ldots, p_{N-1}, p_N, 0, \ldots, 0 & (s < 0) \end{cases}$$

$$q_{(s)} = \begin{cases} 0, \ldots, 0, q_1, q_2, \ldots, q_{N-s} & (s \geq 0) \\ q_{1-s}, \ldots, q_{N-1}, q_N, 0, \ldots, 0 & (s < 0) \end{cases}$$

In other words, if s is non-negative, the first N−s elements of the vector are shifted to the right by s elements, and the elements on the left side are padded with zeros. If s is negative, the last N+s elements of the vector are shifted to the left by s elements, and the right side is padded with zeros.

Next, a cross-correlation sequence $CC_w(p,q)$ between the vectors p and q is defined as indicated by the following formula, in a form that depends on a parameter w. Here, w is an integer that takes on a value in the range $[1, 2N-1]$. The range of w is meant to fix one vector while varying a shift amount i of the other vector from the leftmost (i=1−N when w=1) to the rightmost (i=N−1 when w=2N−1).

$$CC_w(p, q) = R_{w-N}(p, q)$$

$$R_i(p, q) = \begin{cases} \sum_{l=1}^{N-i} p_{l+i} \cdot q_l & (i \geq 0) \\ R_{-i}(p, q) & (i < 0) \end{cases}$$

$$i = w - N$$

When $D_{SBD}(p,q)$ represents the SBD, which is an indicator of the similarity between the pixel value vectors p and q, $D_{SBD}(p,q)$ can be calculated according to the following formula:

$$D_{SBD}(p, q) = 1 - \max_w \left( \frac{CC_w(p, q)}{\sqrt{R_0(p, p) \cdot R_0(q, q)}} \right)$$

In other words, the SBD can be derived by subtracting, from 1, a normalized maximum value of the cross-correlation between the two vectors p and q when the shift amount i is varied within the range described above. Intuitively, this SBD derivation can be said to search for places where a pattern of increase and decrease in pixel values fits between vectors while shifting the array of pixel values without scaling that array. The SBD calculated in this manner is an indicator value which, even if the positions of characteristic patterns of abnormalities appearing in printed images shift or the density of the pattern increases or decreases linearly, appropriately reflects the degree of similarity between the patterns.

(3) State Diagnosis

The determination unit 145 of the image forming apparatus 100 determines the type of abnormality that appears in a printed image from among a plurality of abnormality types based on the read image data obtained by the image obtaining unit 130. For example, when the state diagnosis function is called, the determination unit 145 reads out, from the storage unit 170, the above-described learned model 175 acquired in advance. The determination unit 145 also formats the read image data obtained by the image obtaining unit 130 (e.g., to bitmap data of a predetermined size). The determination unit 145 then applies the formatted read image data to the read-out learned model 175, and determines the type of the abnormality that appears in the printed image based on a result of that application.

For example, in the present embodiment, the determination unit 145 calculates the SBD between the pixel value vector of the read image data and the central points of the k clusters defined by the learned model 175. The cluster corresponding to the central point, among the central points of the k clusters, that has the smallest of the SBDs calculated here is the cluster to which the pixel value vector of the read image data belongs. The determination unit 145 determines that the type of the abnormality that appears in the printed image subject to the diagnosis is the abnormality type corresponding to this cluster to which the pixel value vector of the read image data belongs.

As in the first embodiment, the determination unit 145 may determine that no abnormality appears in the printed image subject to the diagnosis when the smallest distance of the central point of the cluster that indicates the smallest distance from the pixel value vector of the read image data exceeds a threshold. Here, the threshold may be set in advance, or may be set variably.

FIG. 12 is a flowchart illustrating an example of the flow of state diagnosis processing that can be executed by the image forming apparatus 100 according to the present embodiment.

Referring to FIG. 12, first, in step S1210, the reader 200 of the image forming apparatus 100 reads a document on which a printed image suspected to have an abnormality is formed, and generates the read image data. The image obtaining unit 130 obtains the read image data generated by the reader 200.

Next, in step S1220, the determination unit 145 formats the read image data obtained by the image obtaining unit 130, and applies the formatted read image data to the learned model 175 read out from the storage unit 170.

Next, in step S1230, the determination unit 145 calculates the SBD between the cluster central point and the pixel value vector of the read image data for each of the k clusters defined in the learned model 175.

Next, in step S1240, the determination unit 145 determines the cluster, among the k clusters, that indicates the smallest SBD in the result of the calculation in step S1230, i.e., the cluster to which the pixel value vector of the read image data belongs.

Next, in step S1250, the determination unit 145 determines whether the SBD of the cluster determined in step S1240 is smaller than the threshold for determining outliers. If the SBD is less than the threshold, the sequence moves to step S1260. On the other hand, if the SBD is not less than the threshold, the sequence moves to step S1270.

In step S1260, the determination unit 145 determines that an abnormality of the abnormality type corresponding to the cluster to which the pixel value vector of the read image data belongs appears in the printed image. In this case, the information presenting unit 180 presents, to the user, countermeasure information indicating a countermeasure for dealing with the abnormality of that abnormality type.

In step S1270, the determination unit 145 determines that no abnormality appears in the printed image. In this case, the information presenting unit 180 presents, to the user, the result of the diagnosis, namely that no abnormality appears in the printed image.

In the present embodiment, the information presenting unit 180 may present the countermeasure information or state diagnosis result to the user by using any of the information presentation methods described in connection with the first embodiment. For example, the information presenting unit 180 may display, in a display, a procedural description for dealing with the abnormality or a code identifying the countermeasure for dealing with the abnormality. The information presenting unit 180 may cause a light-emitting element to emit light in a light emission pattern that identifies the countermeasure. The information presenting unit 180 may cause audio expressing the countermeasure information to be output from the audio output interface.

The processing described in the present specification using flowcharts or sequence charts may be realized, for example, by a processor of the image forming apparatus 100 or the server apparatus 2 executing a computer program that is stored in storage in advance and loaded into memory.

Note that the image forming apparatus 100 or the server apparatus 2 may accept feedback from the user with respect to the result of the state diagnosis and update the learned model used for the diagnosis. As one example, the "feedback" mentioned here may be a user input indicating whether the abnormality has been resolved as a result of implementing the countermeasure for which guidance has been provided. For example, when feedback indicating that an abnormality has been resolved is input, the accuracy of subsequent state diagnoses can be further improved by updating the cluster definition based on a pair constituted by the read image data used for the diagnosis and the determined abnormality type.

4. CONCLUSION

Thus far, various embodiments of the technique according to the present disclosure have been described with reference to FIGS. 1 to 12. According to the embodiments described above, read image data generated by reading a printed image is obtained, and based on the obtained read image data, the type of abnormality that appears in the printed image is determined from among a plurality of abnormality types. Then, countermeasure information indicating a countermeasure for dealing with the abnormality, corresponding to the determined type, is presented to the user. Accordingly, the user can be guided to take countermeasure for various abnormalities that may appear in printed images according to individual causes, without being limited to a specific type of abnormality. The user can take actions such as replacing components of the apparatus that formed the printed image or calling a cleaning function according to the presented countermeasure information to eliminate the cause of the abnormality and return the device to a normal state. In addition, since the abnormality can be resolved quickly, wastage of consumables such as recording media, toner, or ink can be prevented.

Additionally, according to the embodiments described above, the abnormality type can be determined based on the result of applying the read image data to a learned model that has been acquired in advance by learning based on image data of a plurality of printed images for which respective abnormality types are known. In this case, even if the visual pattern of the abnormality can change to some extent due to factors such as the content of the printed image or changes in environmental conditions, the type of abnormality can be determined with good accuracy while absorbing such changes.

Additionally, according to the above embodiments, the learned model includes clusters respectively corresponding to a predetermined number of abnormality types, the clusters being formed by clustering pixel value vectors of the plurality of printed images. Then, the type of abnormality corresponding to the cluster, among the stated number of clusters in the learned model, to which the pixel value vector of the read image data belongs can be determined to have appeared in the printed image. In this case, visual patterns of abnormalities which arise due to the same cause but appear differently from each other in the training data form a single cluster, and thus the characteristics of patterns of abnormalities which arise due to the same cause can be captured flexibly, and the type of abnormality can be determined robustly.

Additionally, according to the above embodiments, the cluster to which the pixel value vector belongs may be the cluster having the smallest distance of the central point from the pixel value vector, but it can be determined that no abnormality appears in the printed image if that smallest distance exceeds a threshold. It is therefore possible to avoid a situation where a user who has suspected an abnormality in a printed image in which there is actually no abnormality and called the state diagnosis function is guided to use a countermeasure which does not need to be implemented.

Additionally, according to the above first embodiment, the image forming apparatus can transmit, to a server apparatus, a request for applying the read image data of the printed image to the learned model, and receive a result of applying the read image data to the learned model from the server apparatus. The image forming apparatus then determines the type of abnormality that appears in the printed image based on the received result. In this case, the server apparatus performs the operations of applying the read image data to the learned model (e.g., calculating the similarity), which reduces the computational load on the image forming apparatus and can suppress manufacturing costs of the apparatus.

Additionally, according to the above second embodiment, the image forming apparatus applies the read image data of the printed image to the learned model stored by the image forming apparatus itself, and determines the type of abnormality that appears in the printed image based on a result of this application. In this case, the apparatus state can be diagnosed quickly, without being affected by network traffic conditions, and diagnoses that correspond to the causes of apparatus-specific abnormalities can be made with ease.

5. OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of priority from Japanese Patent Application No. 2021-182650, filed on Nov. 9, 2021 which is hereby incorporated by reference herein in its entirety.

What is claimed is:

1. An information processing system comprising:
   an obtaining unit configured to obtain read image data generated by reading an image printed on a sheet by a printing apparatus; and
   a controller configured to determine an abnormality of the printing apparatus by determining, a type of a stain that appears in the read image data obtained by the obtaining unit from among a plurality of stain types based on a learned model that has been acquired in advance through learning processing based on a plurality of pieces of read image data having known stain types,
   wherein the learned model includes clusters respectively corresponding to k stain types,
   wherein k is an integer equal to or larger than two, the clusters having been formed by clustering pixel value vectors of the plurality of pieces of read image data, and
   wherein the controller is configured to determine that the type of the stain that appears in the read image data obtained by the obtaining unit is a stain type corresponding to a cluster to which a pixel value vector of the read image data belongs from among the k clusters of the learned model.

2. The information processing system according to claim 1,
   wherein the pixel value vector of the read image data is determined to belong to a cluster corresponding to a central point, among central points of the k clusters, that has a smallest distance from the pixel value vector.

3. The information processing system according to claim 2, wherein the distance is a Dynamic Time Warping (DTW) distance.

4. The information processing system according to claim 2,
wherein the distance is a Shape-Based Distance (SBD).

5. The information processing system according to claim 2,
wherein the controller is configured to determine that a stain has not appeared in the read image data when the smallest distance exceeds a threshold.

6. The information processing system according to claim 1,
wherein the controller is configured to display, in a display device, the type of the stain determined to have appeared in the read image data.

7. The information processing system according to claim 1,
wherein the controller is configured to display, in a display device, a procedural description for dealing with the abnormality based on the type of the stain determined to have appeared in the read image data.

8. The information processing system according to claim 1,
wherein the controller is configured to display, in a display device, a code that identifies a countermeasure for dealing with the abnormality based on the type of the stain determined to have appeared in the read image data.

9. The information processing system according to claim 1,
wherein the controller is configured to light at least one light-emitting element in a light emission pattern that identifies a countermeasure for dealing with the abnormality based on the type of the stain determined to have appeared in the read image data.

10. The information processing system according to claim 1,
wherein the controller is configured to output, from an audio output interface, audio representing a procedural description or a code identifying a countermeasure for dealing with the abnormality based on the type of the stain determined to have appeared in the read image data.

* * * * *